E. A. JOHNSTON AND C. W. MOTT.
DRAFT CONNECTION.
APPLICATION FILED APR. 29, 1916.

1,354,654.

Patented Oct. 5, 1920.

Inventors.
Edward A. Johnston
and Carl W. Mott,
By
Atty.

UNITED STATES PATENT OFFICE.

EDWARD A. JOHNSTON, OF CHICAGO, AND CARL W. MOTT, OF BERWYN, ILLINOIS, ASSIGNORS, BY MESNE ASSIGNMENTS, TO INTERNATIONAL HARVESTER COMPANY, A CORPORATION OF NEW JERSEY.

DRAFT CONNECTION.

1,354,354.  Specification of Letters Patent.  Patented Oct. 5, 1920.

Application filed April 29, 1916. Serial No. 94,876.

*To all whom it may concern:*

Be it known that we, EDWARD A. JOHNSTON and CARL W. MOTT, citizens of the United States, and residents, respectively, of Chicago, in the county of Cook and State of Illinois, and of Berwyn, in the county of Cook and State of Illinois, have invented certain new and useful Improvements in Draft Connections, of which the following is a full, clear, and exact specification.

This invention relates to draft connections and finds particular application in connection with tractors.

The object of the invention is to improve draft connections generally, making them more flexible and rangy to meet the requirements for successful commercial use.

This object is accomplished by providing a draft connection including a draft member which may be moved in a plurality of different planes and be adjusted in a manner to render its use general and universal to meet the various requirements for successful draft purposes.

The invention is illustrated on the accompanying sheet of drawings, in which—

Figure 1:
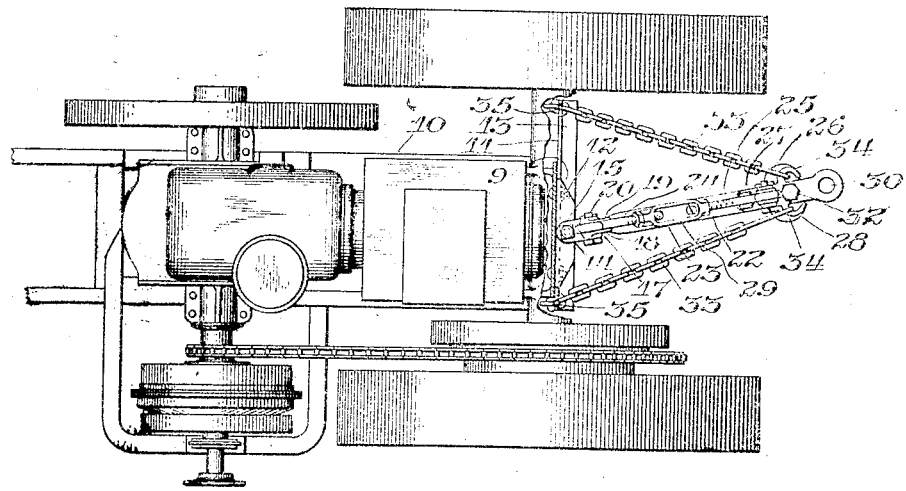
Figure 2:
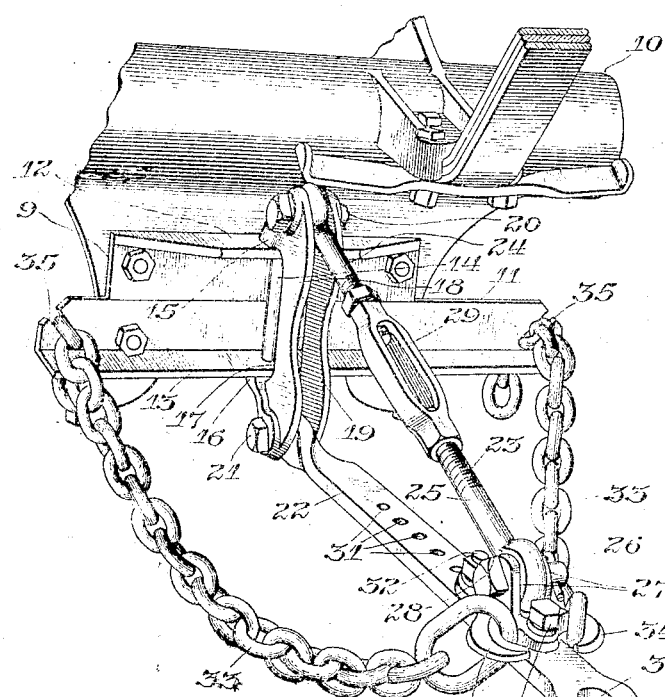

Figure 1 is a fragmentary plan view of a tractor equipped with our improved draft connection; and Fig. 2 is a perspective view of the same draft connection secured to the rear end of a tractor.

The various novel features of our invention will be apparent from the following description and drawings, and will be particularly pointed out in the appended claims.

As above mentioned, this improved draft connection is of particular value in connection with tractors. For that reason we have illustrated this draft connection as applied to a tractor 10, having rear coöperating frame members 9 and 11, to which the draft connection is pivotally connected. The frame member 9 has an upper flanged portion 12, and frame member 11 a lower flanged portion 13, said flanged portions being horizontally arranged and provided with apertures in vertical alinement with each other for the reception of a main bolt 14, which also passes through openings in ear members 15 and 16 of a bracket member 17. It is seen, therefore, that the bolt 14 forms a vertically arranged pivot about which the bracket 17 may be swung.

This bracket member includes two side members 18 and 19, spaced apart and provided at their upper ends with horizontally alined openings for the reception of a bolt 20, the lower ends of said side members also having horizontally arranged openings for the reception of a bolt 21. The bolt 21 also passes through an opening in the front end of a draft member or link 22, which extends rearwardly and is supported normally in a substantially horizontal position by a suitable adjustable supporting link 23 including an eye bolt 24 pivotally mounted between the side members 18 and 19 on the upper bolt 20 and a similar eye bolt 25 pivotally mounted upon a bolt 26 passing through ear members 27 of a clamp member 28 suitably secured to the draft member 22. The inner threaded ends of the eye bolts 24 and 25 are connected by a turn buckle 29, by means of which the rear or free end of the draft member 22 may be raised or lowered in a vertical plane to change the height thereof to obtain a suitable draft connection with a device to be drawn. The rear end of the draft member 22 is provided with an opening 30 for effecting a pin or like connection with the implement or device to be drawn.

Let it be assumed that a gang of plows is to be drawn by the tractor through our improved draft connection. It is well-known that if the draft connection is too low the plows will be given too much suction; that is to say, the plows will have a tendency to sink into the ground too deeply. Conversely, if the draft connection is too high, there will be a great tendency for the plows to be drawn out of the ground. It, therefore, is of great importance to have the gang properly connected to the source of power so that the plows will have the proper amount of suction and will assume the correct plowing depth. In order that this may be done, it may be necessary that the draft member 22 be raised or lowered a certain amount. This may be accomplished readily by adjusting the turn buckle 29. It is needless to say that different gangs have draft connections of different heights. Under these circumstances it is necessary to have the draft member 22 at one level when drawing one gang and at another level when drawing another gang. This being true, our adjustable draft connection finds particular application. If the draft member 22 cannot be raised or lowered sufficiently through the turn buckle alone, the clamp member 28 may be adjusted along the length of the draft member 22 for the desired purpose. To provide for this adjustment, the draft member 22 is provided with a series of openings 31 for the reception of bolts 32 for securing the clamp member 28 in any desired position along the length of the draft member. By means of the adjustable arrangement of the clamp member 28 along the draft member 22, and by means of the turn buckle 29, the draft member or link 22 may be adjusted vertically to any practical extent.

This draft member 22 not only is adjustable to swing in a vertical plane about the bolt 21 as a pivot, but also may swing in a horizontal plane with the bolt 14 as a pivot. For obvious reasons, it is of great value that the draft link be permitted to swing in a horizontal plane while drawing an implement in making a turn. The amount of swinging movement in a horizontal plane of this draft member 22, however, must be limited. To accomplish this we have provided chains 33, which are secured to hook portions 34 of the clamp member 28 and have their free ends releasably connected to the extreme ends of the frame member 11 by means of slots 35 formed therein. It is to be noted that the amount the draft link or member 22 may be permitted to swing sidewardly from its central position may be varied by changing the connection of the free ends of the chains 33 with the slotted portions 35 of the frame member 11. As shown in Fig. 1, the draft link 22 is swung to the right in a horizontal plane and is retained in its limiting position by the left-hand chain 33, the right-hand chain 33 being slack. In the same manner the draft link or member 22 may be limited in its lateral movement to the left.

By means of this arrangement it is seen that the draft member may not only be swung in horizontal, vertical and other intersecting planes, but also adjustably controlled and limited in its movement in said different planes. This draft connection has proved to be of great value for general and universal draft purposes.

It is apparent that there may be various modifications of the arrangement herein particularly shown and described, and it is our intention to cover all such modifications which do not involve a departure from the spirit and scope of our invention as set forth in the following claims.

What we claim as new is:

1. In combination, a support, a bracket connected thereto by a vertical pivot, a draft-member pivotally connected to said bracket, and a supporting link between said bracket and said draft member.

2. In a draft connection, the combination of a support, a bracket connected to said support by a vertical pivot, a draft member pivotally connected to said bracket by a horizontal pivot whereby the draft member may be swung both horizontally and vertically, and means for limiting the horizontal swinging movement of the draft member.

3. In combination, a support, a bracket connected to said support by a vertical pivot, a draft member pivotally connected to said bracket whereby said draft member may be swung in different vertical and horizontal planes, and means for adjusting said draft member in said different vertical planes.

4. In a draft connection, the combination of a support, a bracket connected to said support by a vertical pivot, a draft member pivotally connected to said bracket by a horizontal pivot whereby the draft member may be swung both horizontally and vertically, means for vertically adjusting said draft member, and means for limiting the horizontal swinging movements of the draft member.

5. In combination, a support, a bracket connected to said support by a vertical pivot, a draft member pivotally connected to one end of said bracket, and an adjustable link connecting the other end of said bracket and said draft member.

6. In combination, a support, a bracket connected to said support by a vertical pivot, a draft member pivotally connected to one end of said bracket, an adjustable link connecting the other end of said bracket and said draft member, and flexible connections between said draft member and said support for limiting a lateral movement of said draft member.

7. In combination, a support, a bracket connected to said support by a vertical pivot, a draft member pivotally connected to one portion of said bracket, a clamping member adjustably mounted on said draft member, a link connecting another portion of said bracket and said clamping member, flexible members connecting said clamping member to said support, and means for adjusting said flexible members to change the limit of movement of said draft member.

In testimony whereof we affix our signatures, in the presence of two witnesses.

EDWARD A. JOHNSTON.
CARL W. MOTT.

Witnesses:
L. J. JONSTON,
H. D. MACDONALD.